US012762991B2

(12) United States Patent
Gao

(10) Patent No.: US 12,762,991 B2
(45) Date of Patent: Oct. 13, 2026

(54) DISPLAY CONTROL MODULE AND DISPLAY CONTROL METHOD OF DISPLAY DEVICE

(71) Applicant: ALi Corporation, Hsinchu (TW)

(72) Inventor: Feng Gao, Zhuhai (CN)

(73) Assignee: ALi Corporation, Hsinchu (TW)

( * ) Notice: Subject to any disclaimer, the term of this patent is extended or adjusted under 35 U.S.C. 154(b) by 229 days.

(21) Appl. No.: 18/613,085

(22) Filed: Mar. 21, 2024

(65) Prior Publication Data

US 2024/0355263 A1 Oct. 24, 2024

(30) Foreign Application Priority Data

Apr. 20, 2023 (CN) ......................... 202310429122.1

(51) Int. Cl.
*G09G 3/20* (2006.01)
*G09G 3/36* (2006.01)

(52) U.S. Cl.
CPC ............. *G09G 3/2096* (2013.01); *G09G 3/36* (2013.01); *G09G 2340/00* (2013.01); *G09G 2360/12* (2013.01); *G09G 2360/18* (2013.01); *G09G 2370/00* (2013.01)

(58) Field of Classification Search
CPC .... G09G 3/2096; G09G 3/36; G09G 2340/00; G09G 2360/12; G09G 2360/18; G09G 2370/00
See application file for complete search history.

(56) References Cited

U.S. PATENT DOCUMENTS

2020/0068267 A1 2/2020 Brockmann et al.
2020/0184934 A1* 6/2020 Choi ......................... G06T 1/60
2024/0105101 A1* 3/2024 Ye ............................ G09G 5/39

FOREIGN PATENT DOCUMENTS

CN 110459188 A * 11/2019 ............... G09G 3/36
CN 112384971 A 2/2021
TW 202103142 A 1/2021

* cited by examiner

*Primary Examiner* — Xin Sheng

(57) ABSTRACT

Disclosed are a display control module and a display control method of a display device. The display control module includes a control signal generation module and a plurality of IP core modules. The control signal generation module shields an initial frame control signal based on an enabled underrun signal to generate a frame control signal which is disabled. The plurality of IP core modules are coupled to the control signal generation module, receive the frame control signal, and perform image processing on image data of the same frame based on the frame control signal, so as to generate display image data corresponding thereto. Therefore, when the display device displays abnormally, the plurality of IP core modules continue to perform image processing on a current frame based on the frame control signal.

18 Claims, 6 Drawing Sheets

DISPLAY CONTROL MODULE AND DISPLAY CONTROL METHOD OF DISPLAY DEVICE

CROSS REFERENCE TO RELATED PRESENT DISCLOSURE

This application claims the priority benefit of Chinese Patent Application Serial Number 202310429122.1, filed on Apr. 20, 2023, the full disclosure of which is incorporated herein by reference.

BACKGROUND

Technical Field

The present disclosure relates to the technical field of display devices, in particular to a display control module and a display control method of a display device.

Related Art

In general, a display device at least includes a memory unit, a display engine, and a display panel unit. When the display device performs a display operation, the display engine immediately requests display data corresponding to one frame from the memory unit, and performs image processing on the display data through a plurality of processing modules, and then provides the display data to the display panel unit for display. However, due to the limited bandwidth of the system, when there are too many access requests to be processed by the memory unit, the memory unit is not be able to instantly respond to the display data reading requirements of the display engine, and this situation causes the display engine to fail to obtain the required display data in time and complete the corresponding image processing, and further causes the display panel unit to fail to obtain display data for normal display; that is, the display engine is underrun.

In order to solve the above problems, when the display engine is underrun, a prior art scheme is to abandon the display data of the current frame and perform image processing on the display data of the next frame. In another prior art scheme, the display data of the current line (i.e., the current gate line) of the current frame is discarded, and the image processing is performed on the display data of the following lines (i.e., the next line or the line following multiple lines after the current line).

However, regardless of the processing method of abandoning the data of the current frame or the current line, it needs to be realized through accurate data clearing control and data request control, so as to prevent the processing module of the display engine from performing the image processing operation on the data of the wrong frame or line. Therefore, in order to achieve precise control effects, the control complexity of the processing module of the display engine is correspondingly increased, resulting in complex overall control. At the same time, when the control complexity of the display engine increases, the difficulty of verification and the time required for verification increase significantly.

In view of this, how to effectively reduce the control complexity of the processing module of the display engine and improve the verification speed is an urgent problem to be solved in the industry.

SUMMARY

The embodiments of the present disclosure provide a display control module and a display control method of a display device, which can solve the problems of the control complexity of the existing processing module and the difficulty in performing verification quickly.

In order to solve above-mentioned technical problems, the present disclosure provides an embodiment of a display control module, which includes a control signal generation module and a plurality of IP core modules. The control signal generation module shields an initial frame control signal based on an enabled underrun signal to generate a frame control signal which is disabled. The plurality of IP core modules are coupled to the control signal generation module, and configured to receive the frame control signal, and perform image processing on image data of the same frame based on the frame control signal, so as to generate display image data corresponding thereto.

In order to solve above-mentioned technical problems, the present disclosure provides an embodiment of a display control method, which includes shielding an initial frame control signal based on an enabled underrun signal to generate a frame control signal which is disabled; and providing the frame control signal to a plurality of IP core modules.

In order to solve above-mentioned technical problems, the present disclosure provides an embodiment of a display control method for a display device, wherein the display device includes an image frame streaming path and an image frame stream transmitted on the image frame streaming path, the image frame stream includes a plurality of image frame, a plurality of processing units are sequentially arranged on the image frame streaming path, the plurality of processing units perform different processing on the same image frame of the image frame stream, each of the plurality of the processing unit receives an image frame frequency signal to process the plurality of image frames of the image frame stream, and each of the plurality of processing units processes a current image frame of the plurality of image frames at a first time point. The display control method includes: after the first time point, generating a prompt signal when transmission of the image frame stream is uncoordinated on the image frame streaming path; generating an image frame frequency disabling signal based on a combination of the image frame frequency signal and the prompt signal; and for each of the plurality of the processing units, receiving the image frame frequency disabling signal after the first time point, and keeping processing the current image frame based on the image frame frequency disabling signal.

In the embodiments of the present disclosure, by controlling the frame control signal, the plurality of IP core modules (i.e., processing units) do not abandon the image processing of the current frame or the current line based on the frame control signal when the display device is underrun, and continue the image processing of the current frame until the image processing of the current frame is completed. Therefore, the plurality of IP core modules in the embodiments of the present disclosure do not need to have complex clearing and/or image data request control capabilities. At the same time, the underrun control of the plurality of IP core modules in the embodiments of the present disclosure is concentrated in a single display control module, which effectively simplifies the design complexity of the plurality of IP core modules, thus greatly reducing the difficulty of controlling the IP core modules and increasing the convenience of control verification/debugging. Therefore, the display control module and display control method in the embodiments of the present disclosure can achieve the purpose of simplifying the control complexity of the IP core modules and increasing the convenience of control verification/debugging.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The technical solutions in the embodiments of the present disclosure are clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work are within the protection scope of the present disclosure.

Figure 1:
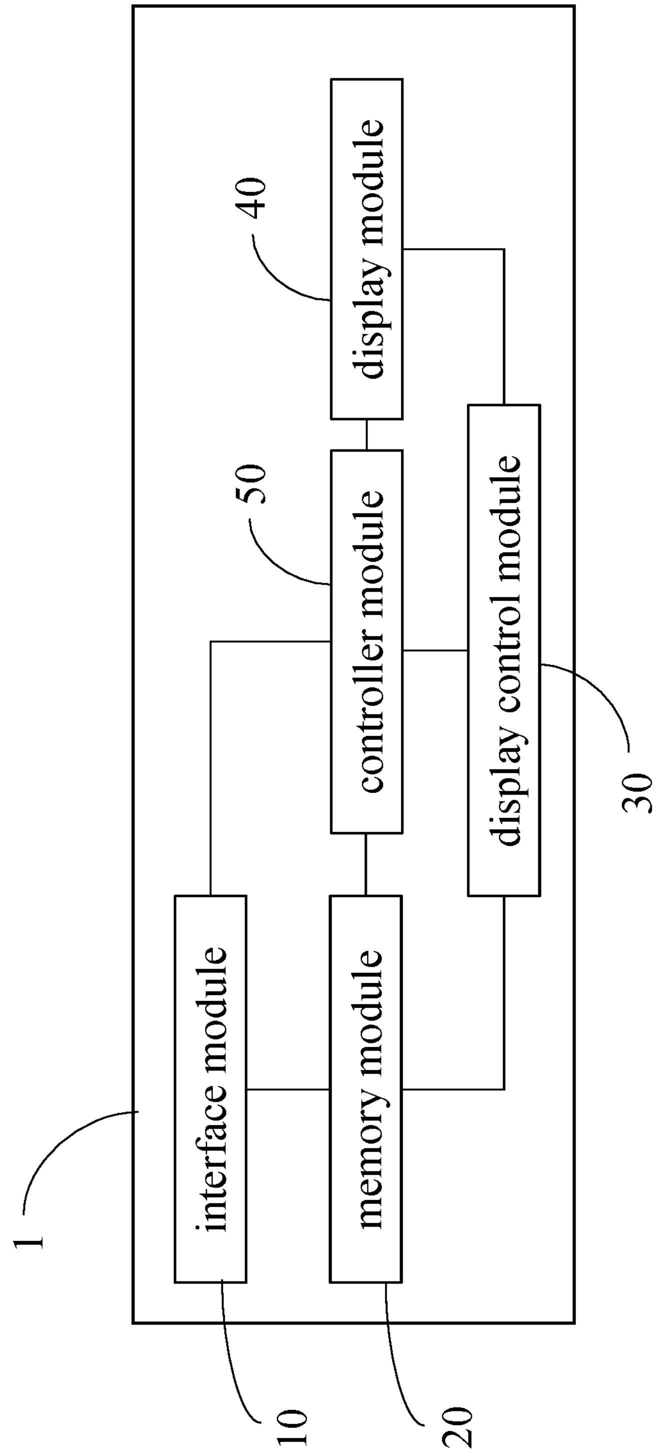
FIG. 1 is a schematic diagram of an embodiment of a display device.

Please refer to FIG. 1, which is a schematic diagram of an embodiment of a display device. The display device 1 comprises an interface module 10, a memory module 20, a display control module 30, a display module 40 and a controller module 50. The controller module 50 is coupled to the interface module 10, the memory module 20, the display control module 30, and the display module 40, and is used to execute the system program(s) to control the interface module 10, the memory module 20, the display control module 30, and the display module 40 to perform corresponding actions and/or data exchange.

In one embodiment, the display device 1 is, for example, a liquid crystal display, and the present disclosure is not limited thereto.

Further, the interface module 10 is used for communication coupling with an external device, so as to receive an image frame stream from the external device, and the image frame stream includes image data of a plurality of frames (i.e., image frames).

In one embodiment, the interface module 10 is, for example, an interface circuit conforming to the standards of Universal Serial Bus (USB) and High Definition Multimedia Interface (HDMI), and the present disclosure is not limited thereto.

In one embodiment, the external device is, for example, a host device, and the present disclosure is not limited thereto.

Further, the memory module 20 is coupled with the interface module 10 and the display control module 30, and the memory module 20 executes an access program corresponding to the image data. In one embodiment, the memory module 20 stores the image data received by the interface module 10. In another embodiment, the memory module 20 reads the stored image data based on the request of the display control module 30, and the read image data is used to be transmitted to the display control module 30.

In one embodiment, the memory module 20 is, for example, a random access memory, and the present disclosure is not limited thereto.

Further, the display control module 30 is coupled with the display module 40. The display control module 30 is configured to request image data from the memory module 20, and perform corresponding image processing on the received image data to generate display image data corresponding thereto.

Further, the display module 40 is configured to request the display image data for display from the display control module 30, and accordingly execute the corresponding display program to display a display screen corresponding to the display image data.

In one embodiment, the display module 40 is, for example, a display panel device of a display, and the present disclosure is not limited thereto.

Figure 2:
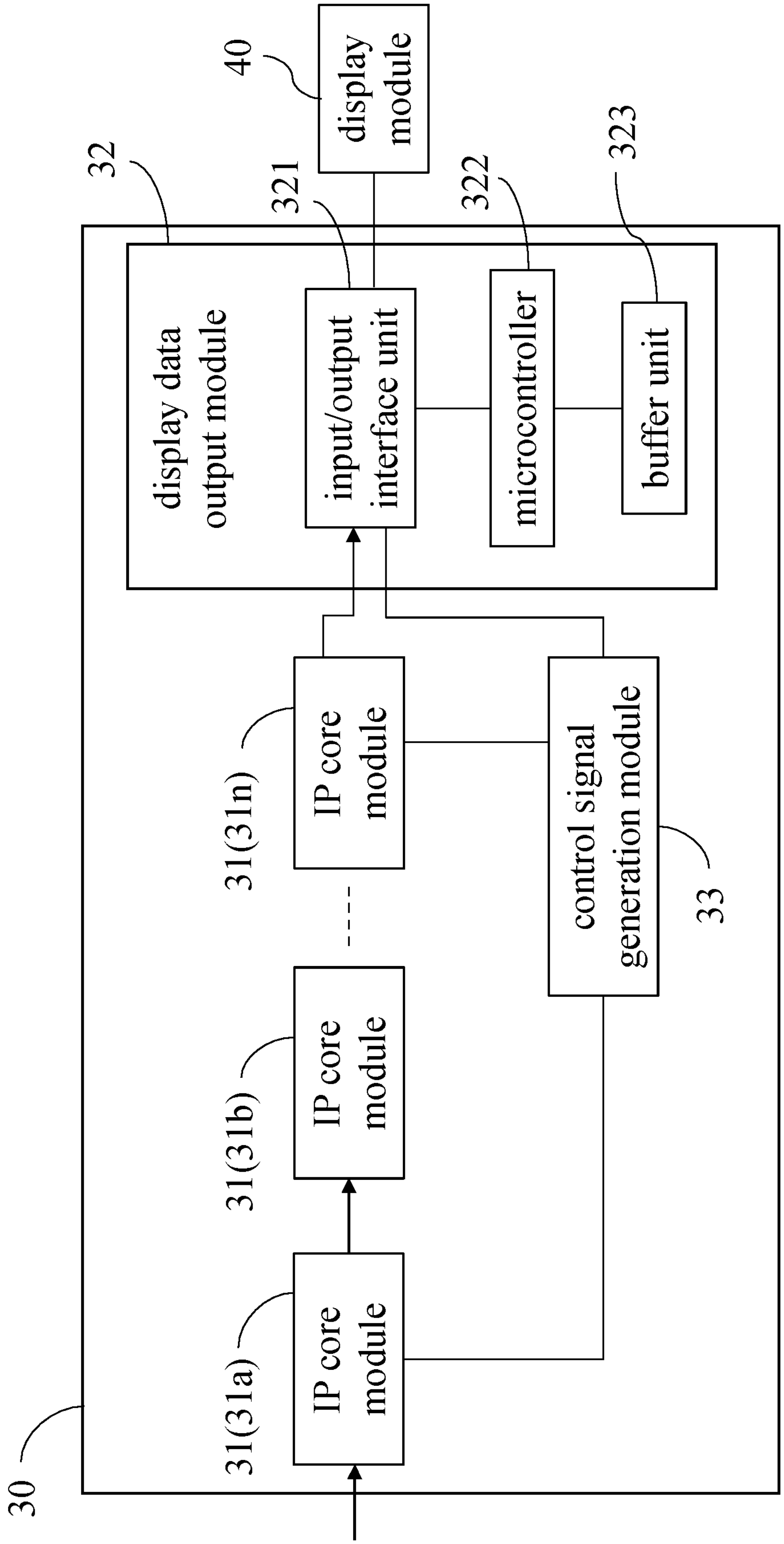
FIG. 2 is a schematic diagram of a display control module according to an embodiment of the present disclosure.

Please refer to FIG. 2, which is a schematic diagram of the display control module 30 according to an embodiment of the present disclosure. In present disclosure, the display control module 30 comprises a plurality of IP core modules 31 (i.e., 31*a*, 31 *b* . . . , 31*n*), a display data output module 32 and a control signal generation module 33.

The plurality of IP core modules 31 are connected in series with each other to form a frame (i.e., image frame) streaming path, and the plurality of IP core modules 31 are individually coupled to the control signal generation module 33, to receive a frame control signal from the control signal generation module 33. The plurality of IP core modules 31 perform image processing on the image data of the same frame (i.e., the current frame) based on the frame control signal, and transmit the processed image data to the next IP core module 31 connected in series to generate the display image data corresponding thereto.

Further, the first IP core module 31, such as 31*a*, in the plurality of IP core modules 31 connected in series is configured to receive the image data from the memory module 20 (that is, to receive the initial image data that has not been processed by the display control module 30), and the last IP core module 31, such as 31*n*, in the plurality of IP core modules 31 connected in series is configured to output the display image data after image processing, and transmit the display image data to the display data output module 32. That is, the first IP core module 31 of the plurality of IP core modules 31 connected in series is coupled to the memory module 20, and the last IP core module 31 of the plurality of IP core modules 31 connected in series is coupled to the display data output module 32.

In this embodiment, each IP core module 31 is configured to execute different image processing programs. For example, one IP core module 31 in the plurality of IP core modules 31 is configured to perform display brightness processing, and another IP core module 31 in the plurality of IP core modules 31 is configured to perform display color temperature processing, and the present disclosure is not limited thereto. Therefore, the display control module 30 generates display image data to be displayed by the display module 40 through the plurality of IP core modules 31 executing different image processing programs.

Further, the plurality of IP core modules 31 execute a reset (clear) program based on the received frame control signal, clear the image data and other related data in the IP core module 31, and wait to receive the image data corresponding to the next frame.

Further, after completing the image processing, the plurality of IP core modules 31 generate operation completion indication signals individually, and the operation completion indication signals are transmitted to the control signal generation module 33, to prompt the control signal generation module 33 that the plurality of IP core modules 31 have finished the image processing program on the current frame.

In one embodiment, some of the IP core modules 31 in the plurality of IP core modules 31 do not receive the frame control signal and do not perform image processing, such as the IP core module 31*b*. For example, one IP core module 31 in the plurality of IP core modules 31 can only be configured to transmit the image data processed by the previous IP core module 31 to the next IP core module 31 without performing image processing on the received image data. The IP core module 31 is used as a delivery pipe in this embodiment.

In one embodiment, the IP core module 31 is, for example, a microprocessor, and the present disclosure is not limited thereto.

Please refer to FIG. 2 again, the display data output module 32 comprises an input/output interface unit 321, a microcontroller 322 and a buffer unit 323, wherein the microcontroller 322 is coupled to the input/output interface unit 321 and the buffer unit 323.

Further, the input/output interface unit 321 is coupled to the control signal generation module 33, the last IP core module 31 in the plurality of IP core modules 31 and the display module 40. The input/output interface unit 321 is configured to receive the display image data transmitted from the last IP core module 31 in the plurality of IP core modules 31. The input/output interface unit 321 receives the data request instruction from the display module 40. The input/output interface unit 321 is further configured to transmit the display image data read from the buffer unit 323 to the display module 40. The input/output interface unit 321 is further configured to transmit the image data volume indication signal to the control signal generation module 33. In one embodiment, the input/output interface unit 321 is, for example, an interface connection circuit such as a golden finger, and the present disclosure is not limited thereto.

The buffer unit 323 is configured to store the display image data received by the input/output interface unit 321, and the buffer unit 323 is further configured to read the stored display image data. In this embodiment, the storage capacity of the buffer unit 323 is less than the data volume of display image data of one frame. Therefore, the overall size of the display data output module 32 can be effectively reduced.

In one embodiment, the buffer unit 323 is, for example, a static random-access memory (SRAM), and the present disclosure is not limited thereto.

The microcontroller 322 is configured to execute an operation program, so that the display data output module 32 performs corresponding actions based on the operation program. Further, the microcontroller 322 is configured to execute the operation program to make the input/output interface unit 321 execute the transmission and reception of the display image data, and make the buffer unit 323 execute the storage and reading of the display image data. Further, the microcontroller 322 reads the corresponding display image data from the buffer unit 323, such as the display image data corresponding to the next line of the current frame, according to the data request instruction of the display module 40. Further, the microcontroller 322 detects the image data volume of the display image data stored in the buffer unit 323 in real time, generates an image data volume indication signal indicating the data volume of image data accordingly, and makes the image data volume indication signal sent to the control signal generation module 33 through the input/output interface unit 321.

In one embodiment, the microcontroller 322 is, for example, a single-chip microcomputer circuit, and the present disclosure is not limited thereto.

Figure 3:
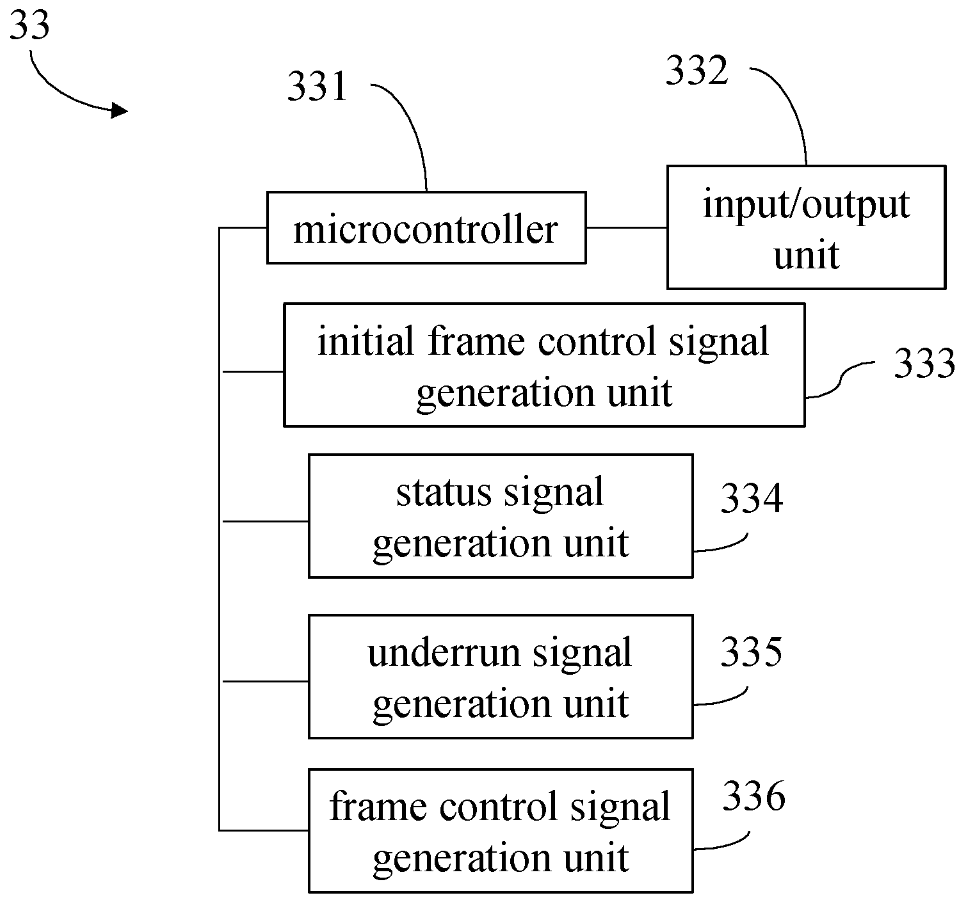
FIG. 3 is a schematic diagram of a control signal generation module according to an embodiment of the present disclosure.

Please refer to FIG. 3, which is a schematic diagram of the control signal generation module 33 according to an embodiment of the present disclosure. The control signal generation module 33 comprises a microcontroller 331, an input/output unit 332, an initial frame control signal generation unit 333, a status signal generation unit 334, an underrun signal generation unit 335 and a frame control signal generation unit 336, wherein the microcontroller 331 is coupled to the input/output unit 332, the initial frame control signal generation unit 333, the status signal generation unit 334, the underrun signal generation unit 335 and the frame control signal generation unit 336.

The input/output unit 332 is configured to receive the image data volume indication signal transmitted from the display data output module 32, and transmit the frame control signal to the coupled IP core modules 31.

The initial frame control signal generation unit 333 is configured to generate (enable) an initial frame control signal at a fixed frequency. The initial frame control signal includes an initial frame start signal and an initial frame end signal, and the timing of the initial frame start signal is earlier than that of the corresponding initial frame end signal.

In this embodiment, the fixed frequency corresponds to the display screen refresh rate of the display module 40 of the display device 1, such as 60 Hz, and the present disclosure is not limited thereto.

The status signal generation unit 334 is configured to generate a core module status signal corresponding to the statuses of the plurality of IP core modules 31. Further, the status signal generation unit 334 generates (enables) the core module status signal based on the operation completion indication signals from the plurality of IP core modules 31. The core module status signal is configured to indicate that the plurality of IP core modules 31 all finish the image processing program on the current frame.

The underrun signal generation unit 335 is configured to enable an underrun signal based on the image data volume indication signal, and disable the underrun signal based on the core module status signal. Further, the underrun signal generation unit 335 determines that the image data volume indication signal indicates that an image data volume of the displayed image data is too low, and then enables the underrun signal. For example, the image data volume indication signal indicates that the image data volume of the displayed image data is zero or the image data volume of the displayed image data is less than or equal to an image data volume threshold. In one embodiment, the image data volume threshold is, for example, the image data volume of ten pixels, and the present disclosure is not limited thereto. In this embodiment, because the data volume of image data stored in the buffer unit 323 is too low to provide the display image data requested by the display module, such as the data volume for one line, the underrun signal generation unit 335 enables the underrun signal, which indicates that the underrun condition occurs. Further, the underrun signal generation unit 335 disables the underrun signal based on the core module status signal and the initial frame end signal. After the underrun signal is enabled, the underload signal generating unit 335 disables the underload signal based on the core module status signal generated (enabled) by the status signal generation unit 334 and the initial frame end signal, wherein the timing of the core module status signal is earlier than that of the initial frame end signal, the initial frame end signal is the first initial frame end signal after the core module status signal is enabled, and the underrun signal is disabled at a time point later than the timing of the core module status signal and the initial frame end signal.

The frame control signal generation unit 336 is configured to shield the initial frame start signal and the initial frame end signal based on the enabled underrun signal to generate the frame control signal, wherein the frame control signal includes a frame start signal and a frame end signal.

In one embodiment, the frame control signal generation unit 336 performs a NAND operation on the initial frame start signal and the initial frame end signal based on the enabled underrun signal to generate the frame start signal and the frame end signal.

Therefore, the plurality of IP core modules 31 receiving the frame control signal perform image processing on each frame according to the timing of the frame control signal.

In one embodiment, the initial frame control signal generation unit 333, the status signal generation unit 334, the underrun signal generation unit 335 and the frame control signal generation unit 336 can be realized by software programs or hardware circuits, and the present disclosure is not limited thereto.

In one embodiment, the control signal generation module 33 can be realized by the IP core module 31. In another embodiment, the control signal generation module 33 can be disposed in the display data output module 32 for implementation, and the present disclosure is not limited thereto.

Figure 4:
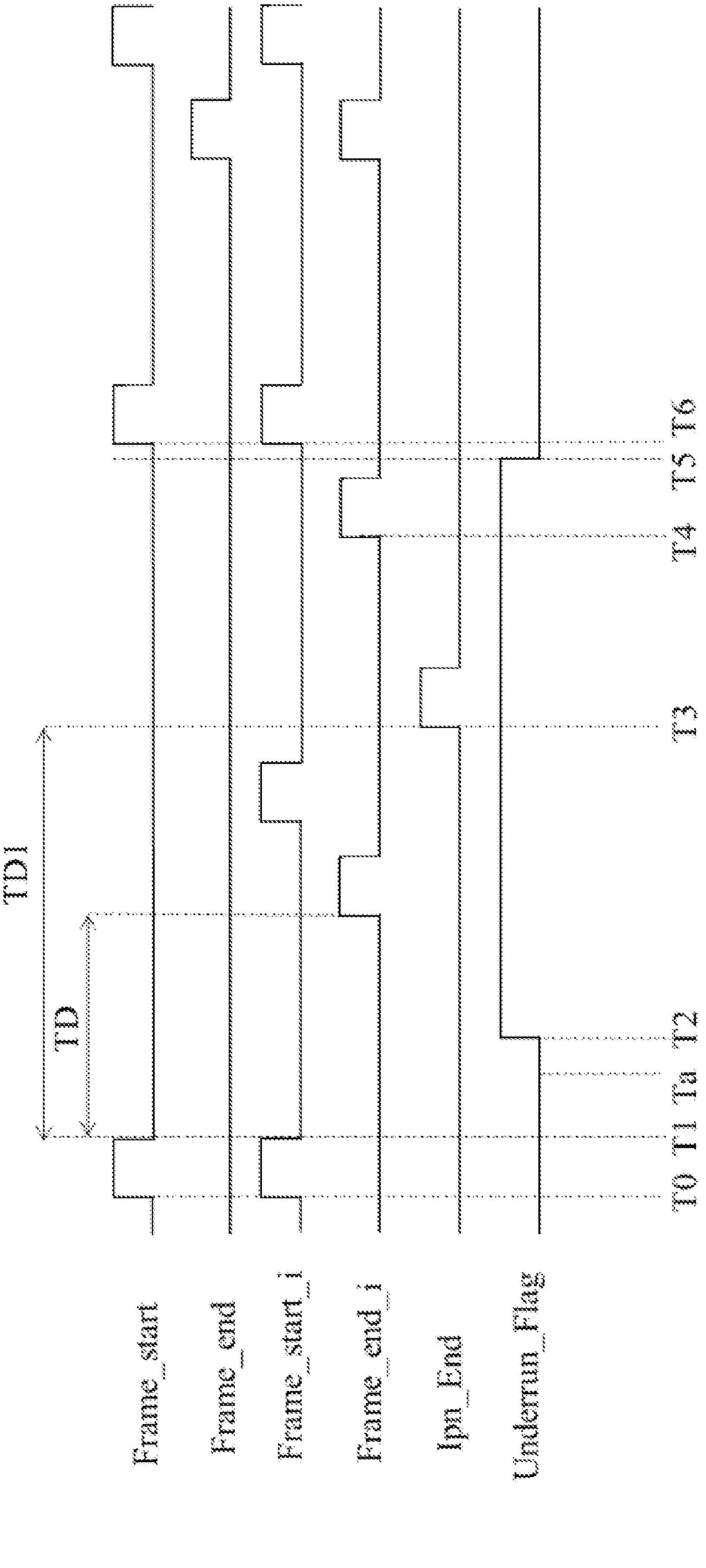
FIG. 4 is a timing schematic diagram according to an embodiment of the present disclosure.

The operation method of the control signal generation module 33 of the present disclosure is further described in conjunction with FIG. 3 and FIG. 4. In FIG. 4, the frame start signal is marked as Frame_start, the frame end signal is marked as Frame_end, the initial frame start signal is marked as Frame_start_i, the initial frame end signal is marked as Frame_end_i, the core module status signal is marked as Ipn_End, and the underrun signal is marked as Underrun_Flag.

At the time point T0, the underrun signal Underrun_Flag is disabled, so the timing of the frame start signal Frame_start is the same as the timing of the initial frame start signal Frame_start_i, the frame start signal Frame_start is enabled, and the plurality of IP core modules 31 execute a reset (clear) program according to the enabled frame start signal Frame_start. At time point T1, the plurality of IP core modules 31 perform image processing on the image data of the current frame after completing the reset (clearing) program. At the time point T2, the underrun signal Underrun_Flag is enabled, which means that the underrun condition occurs. At time point T3, the underrun signal Underrun_Flag remains enabled, and the core module status signal Ipn_End is enabled. At time T4, the initial frame end signal Frame_end_i whose timing is later than the timing of the core module status signal Ipn_End is enabled, and the underrun signal Underrun_Flag remains enabled. At time point T5, the underrun signal Underrun_Flag is disabled based on the core module status signal Ipn_End and the initial frame end signal Frame_end_i.

Therefore, the underrun signal Underrun_Flag remains enabled between the time point T2 and the time point T5, and at the same time, the underrun signal Underrun_Flag remains enabled between the time point T2 and the time point T5, and the initial frame start signal Frame_start_i and the initial frame end signal Frame_end_i are shielded by the underrun signal Underrun_Flag to generate the frame start signal Frame_start and the frame end signal Frame_end which remain disabled. Therefore, between the time point T2 and the time point T5, since the frame start signal Frame_start and the frame end signal Frame_end remain disabled, the plurality of IP core modules 31 performing image processing according to the frame start signal Frame_start and the frame end signal Frame_end (as shown in FIG. 2) determines that the period between the time point T2 and the time point T3 is still within the processing period of the current frame based on the frame start signal Frame_start and the frame end signal Frame_end, and therefore continues to perform image processing on the image data of the current frame. That is, the plurality of IP core modules 31 (as shown in FIG. 2) perform image processing on the current frame at an interval time TD1. At the same time, at the time point T3, since the plurality of IP core modules 31 have completed the image processing of the current frame, the core module status signal Ipn_End is enabled. After the initial frame end signal Frame_end_i is enabled at time T4, the underrun signal Underrun_Flag is disabled again. Therefore, the initial frame start signal Frame_start_i and the initial frame end signal Frame_end_i after the time point T4 are no longer shielded by the underrun signal Underrun_Flag, and the frame start signal Frame_start and the frame end signal Frame_end after the time point T5 have the same timing as the initial frame start signal Frame_start_i and the initial frame end signal Frame_end_i. Therefore, after the time point T4, in the case of no underrun, the plurality of IP core modules 31 (as shown in FIG. 2) resume image processing on image data of one frame with the preset frame processing time length (i.e., interval time TD) based on the frame start signal Frame_start and the frame end signal Frame_end. That is, when the Underrun_Flag is disabled, the frame control signal is the same as the initial frame control signal, and when the Underrun_Flag is enabled, the frame control signal is different from the initial frame control signal, and the frame control signal remains disabled.

Because the control signal generation module of the present disclosure can control the frame control signal, the plurality of IP core modules continue to perform image processing on the current frame without abandoning the current frame based on the frame control signal when the display device is underrun, until the image processing of the current frame ends. Therefore, the IP core modules of the embodiment of the present disclosure do not need to have complex clearing and/or image data request control to execute the operation of discarding the current frame and reading the next frame. At the same time, the underrun processing of the plurality of IP core modules in the embodiment of the present disclosure is implemented in a single display control module, which greatly reduces the control complexity of the IP core modules and increases the convenience of control verification/debugging. Therefore, the display control module and display control method in the embodiments of the present disclosure can achieve the purpose of simplifying the control complexity of the IP core modules and increasing the convenience of control verification/debugging.

Figure 5:
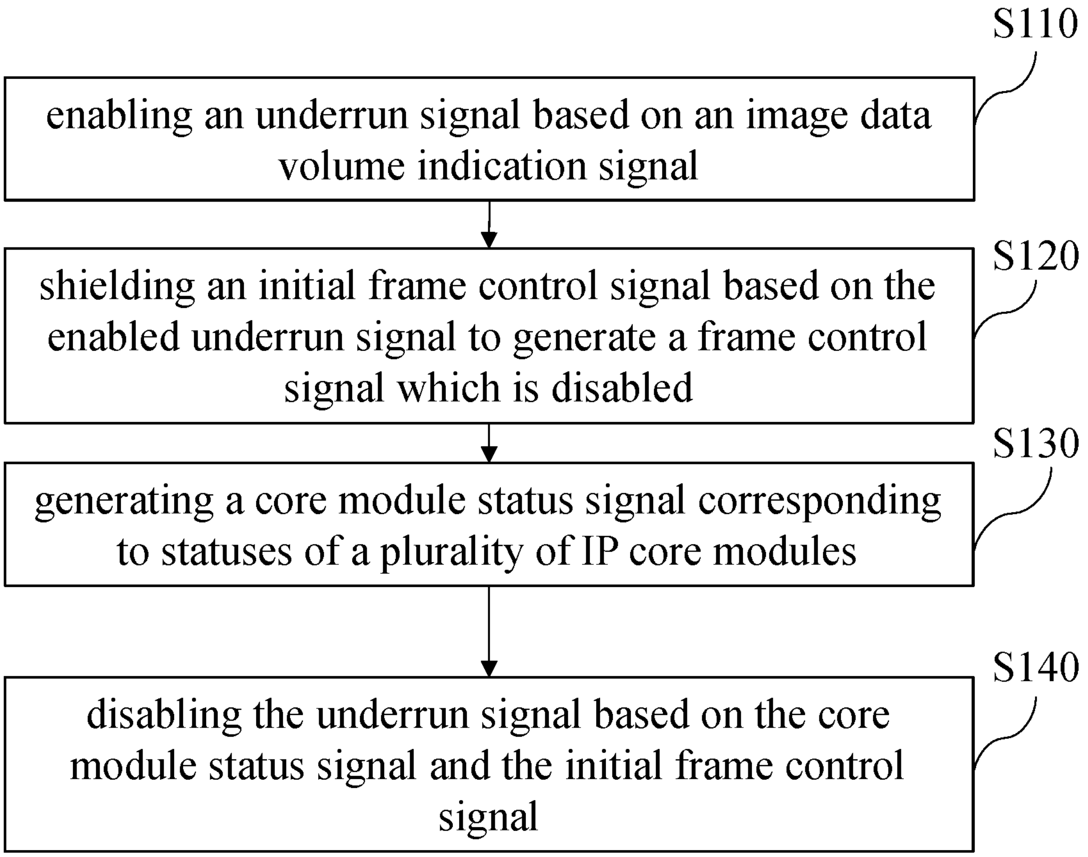
FIG. 5 is a flowchart of a display control method according to an embodiment of the present disclosure.

According to the content of above-mentioned embodiments, the present disclosure further summarizes to provide a display control method for a display device, as shown in FIG. 5, and please refer to FIG. 1 to FIG. 3 together. The display control method comprises the following steps:

Step S110: enabling an underrun signal based on an image data volume indication signal. In this step, the underrun signal generation unit 335 is configured to enable the underrun signal based on the image data volume indication signal. Further, the underrun signal generation unit 335 determines that the image data volume indication signal indicates that the image data volume of the display image data is too low, and then enables the underrun signal.

Step S120: shielding an initial frame control signal based on the enabled underrun signal to generate a frame control signal which is disabled. In one embodiment, the frame control signal generation unit 336 performs a NAND operation on the initial frame start signal and the initial frame end signal based on the enabled underrun signal to generate the frame start signal and the frame end signal of the frame control signal, and provides the frame control signal to the plurality of IP core modules 31.

Step S130: generating a core module status signal corresponding to statuses of a plurality of IP core modules. Further, the status signal generation unit 334 generates the core module status signal based on the operation completion indication signals of the plurality of IP core modules 31, and the core module status signal is configured to indicate that each of the plurality of IP core modules 31 has completed the image processing on the current frame.

Step S140: disabling the underrun signal based on the core module status signal and the initial frame control signal. Further, after the underrun signal is enabled, the underrun signal generation unit 335 disables the underload signal after the core module status signal generated (enabled) by the status signal generation unit 334 and the first initial frame end signal following the core module status signal is enabled, wherein the timing of the core module status signal is earlier than that of the aforementioned initial frame end signal, and the underrun signal is disabled at a time point later than the timing of the core module status signal and the initial frame end signal.

Figure 6:
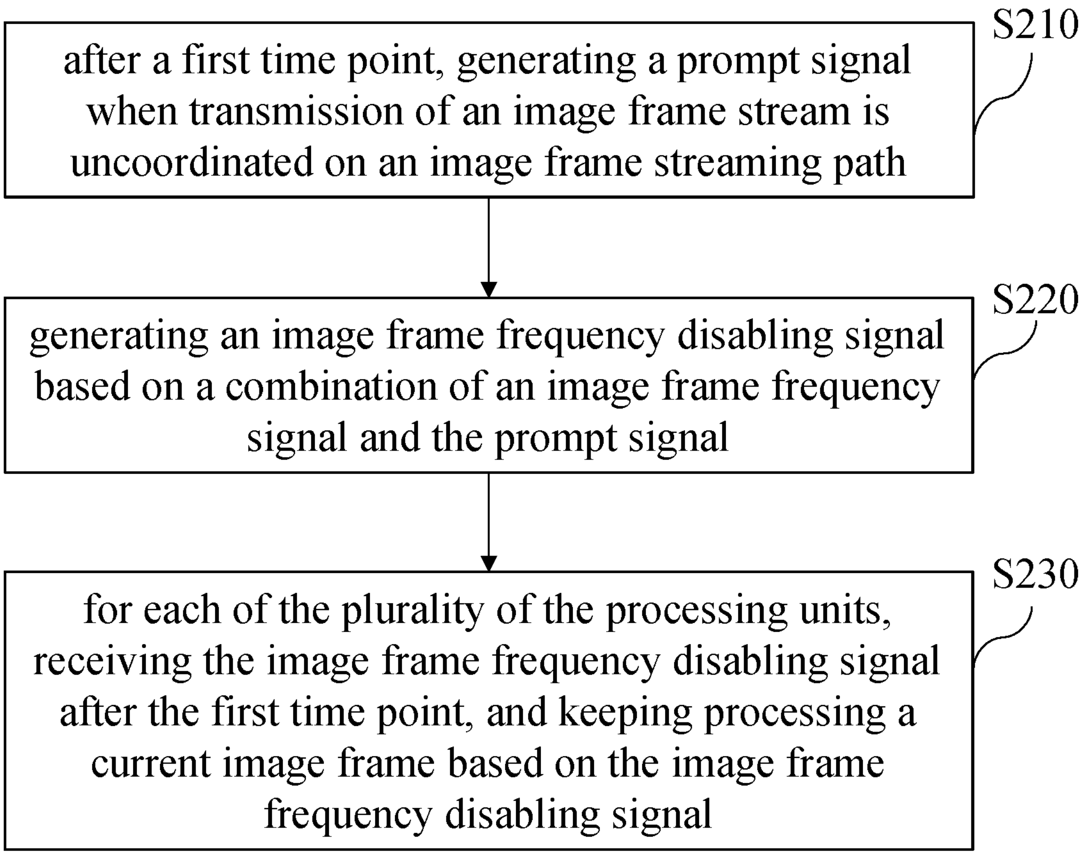
FIG. 6 is another flowchart of a display control method according to an embodiment of the present disclosure.

According to the content of above-mentioned embodiments, the present disclosure further summarizes to provide a display control method of a display device, as shown in FIG. 6, and please refer to FIG. 1 to FIG. 4 together. The display control method comprises the following steps:

Step S210: after a first time point, generating a prompt signal when transmission of an image frame stream is uncoordinated on an image frame streaming path. As shown in FIG. 4, the underrun signal generation unit 335 enables the underrun signal Underrun_Flag at the time point T2 after the time point Ta.

Step S220: generating an image frame frequency disabling signal based on a combination of an image frame frequency signal and the prompt signal. As shown in FIG. 4, between the time point T2 and the time point T5, the frame control signal generation unit 336 generates the frame control signal based on the combination of the initial frame control signal and the enabled underrun signal.

Step S230: for each of the plurality of the processing units, receiving the image frame frequency disabling signal after the first time point, and keeping processing a current image frame based on the image frame frequency disabling signal. As shown in FIG. 4, between the time point T2 and the time point T5 after the time Ta, the IP core modules 31 receive the frame control signal and keep processing the current image frame based on the frame control signal.

Please continue to refer to FIG. 4, there is an interval time TD between two adjacent image frames, wherein the time to keep processing the first image frame (i.e., interval time TD1) is greater than the interval time TD. Keep processing the first image frame does not depend on the image frame frequency signal (i.e., Frame_start_i and Frame_end_i). For each processing unit (i.e., IP core module 31), after the time to keep processing the current image frame is greater than the interval time DI (e.g., after time point T6), the next image frame is processed based on the image frame frequency signal. For each processing unit, after the time to keep processing the current image frame is greater than the interval time TD, the prompt signal (i.e., Underrun_Flag) is removed and the image frame frequency disabling signal is removed based on the combination of the image frame frequency signal and the prompt signal (e.g., at the time point T5), so as to process the next image frame based on the image frame frequency signal when the image frame frequency disabling signal is unable to be relied upon. The image frame frequency disabling signal is generated based on a combination of the image frame frequency signal and the prompt signal after the first time point (e.g., the time point Ta).

In summary, since the display control module of the present disclosure includes a control signal generation module which can control the frame control signal, the plurality of IP core modules continue image processing for the current frame based on the frame control signal when the display device is underrun. Therefore, the plurality of IP core modules in the embodiments of the present disclosure do not need to have complex clearing and/or image data request control capabilities. At the same time, the underrun control of the plurality of IP core modules in the embodiments of the present disclosure is concentrated in a single display control module, which effectively simplifies the design complexity of the plurality of IP core modules, thus greatly reducing the difficulty of controlling the IP core modules and increasing the convenience of control verification/debugging. Therefore, the display control module and display control method in the embodiments of the present disclosure can achieve the purpose of simplifying the control complexity of the IP core modules and increasing the convenience of control verification/debugging.

It should be noted that, as used herein, the terms "including", "comprising" or any other variation thereof are intended to encompass non-exclusive inclusion such that a process, method, article, or system that includes a series of elements can not only include those elements, but also includes other elements not explicitly listed, or elements inherent to such a process, method, article, or system. Without more restrictions, an element limited by the sentence "including a . . . " does not exclude the existence of other identical elements in the process, method, article, or system that includes the element.

The embodiments of the present disclosure have been described above in conjunction with the accompanying drawings. However, the present disclosure is not limited to the above-mentioned specific embodiments. The above-mentioned specific embodiments are only schematic, but not restrictive. With the inspiration of the present disclosure, those of ordinary skill in the art may also take many forms which all fall within the protection of the present disclosure, without departing from the spirit of the present disclosure and the scope of protection of the claims.

What is claimed is:

1. A display control module of a display device, comprising:

a control signal generation module configured to shield an initial frame control signal based on an enabled underrun signal to generate a frame control signal which is disabled; and a plurality of IP core modules coupled to the control signal generation module, and configured to receive the frame control signal, and perform image processing on image data of the same frame based on the frame control signal, so as to generate display image data corresponding thereto;

wherein the control signal generation module comprises:

an initial frame control signal generation unit configured to generate an initial frame start signal and an initial frame end signal of the initial frame control signal at a fixed frequency;

a status signal generation unit configured to generate a core module status signal corresponding to statuses of the plurality of IP core modules;

an underrun signal generation unit configured to enable an underrun signal based on an image data volume indication signal, and disable the underrun signal based on the core module status signal; and a frame control signal generation unit configured to shield the initial frame start signal and the initial frame end signal based on the enabled underrun signal, so as to generate a frame start signal and a frame end signal of the frame control signal.

2. The display control module of the display device according to claim 1, wherein the status signal generation unit generates the core module status signal based on operation completion indication signals of the plurality of IP core modules which are received, and the core module status signal indicates that each of the plurality of IP core modules has completed the image processing of the same frame.

3. The display control module of the display device according to claim 1, wherein the underrun signal generation unit determines that the image data volume indication signal indicates that an image data volume of the display image data is zero or the image data volume of the display image data is less than or equal to an image data volume threshold, and then enables the underrun signal.

4. The display control module of the display device according to claim 1, wherein the underrun signal generation unit disables the underrun signal based on the core module status signal and the initial frame end signal.

5. The display control module of the display device according to claim 1, wherein the frame control signal generation unit performs a NAND operation on the initial frame start signal and the initial frame end signal based on the enabled underrun signal to generate the frame start signal and the frame end signal of the frame control signal.

6. The display control module of the display device according to claim 1, wherein the fixed frequency corresponds to a display screen refresh rate of the display module of the display device.

7. The display control module of the display device according to claim 1, wherein the display control module further comprises a display data output module; the display data output module stores the display image data, and generates the image data volume indication signal based on an image data volume of the display image data which is stored.

8. A display control method of a display device, comprising:

shielding an initial frame control signal based on an enabled underrun signal to generate a frame control signal which is disabled; and providing the frame control signal to a plurality of IP core modules;

enabling an underrun signal based on an image data volume indication signal;

generating a core module status signal corresponding to statuses of the plurality of IP core modules; and disabling the underrun signal based on the core module status signal.

9. The display control method of the display device according to claim 8, wherein the NAND operation is performed on the initial frame control signal based on the enabled underrun signal to generate the frame control signal.

10. The display control method of the display device according to claim 8, wherein when the image data volume indication signal indicates that an image data volume of display image data is zero or the image data volume of the display image data is less than or equal to an image data volume threshold, the underrun signal is enabled.

11. The display control method of the display device according to claim 10, wherein the core module status signal is generated based on operation completion indication signals of the plurality of IP core modules, and the core module status signal indicates that each of the plurality of IP core modules has completed image processing of the same frame.

12. The display control method of the display device according to claim 10, wherein the underrun signal is disabled based on the core module status signal and an initial frame end signal of the initial frame control signal.

13. A display control method for a display device, wherein the display device includes an image frame streaming path and an image frame stream transmitted on the image frame streaming path, the image frame stream comprises a plurality of image frame, a plurality of processing units are sequentially arranged on the image frame streaming path, the plurality of processing units perform different processing on the same image frame of the image frame stream, each of the plurality of the processing unit receives an image frame frequency signal to sequentially process the plurality of image frames of the image frame stream, each of the plurality of processing units processes a current image frame of the plurality of image frames at a first time point, and the display control method comprises:

after the first time point, generating a prompt signal when transmission of the image frame stream is uncoordinated on the image frame streaming path;

generating an image frame frequency disabling signal based on a combination of the image frame frequency signal and the prompt signal; and for each of the plurality of the processing units, receiving the image frame frequency disabling signal after the first time point, and keeping processing the current image frame based on the image frame frequency disabling signal.

14. The display control method according to claim 13, wherein there is an interval time between two adjacent image frames, and a time to keep processing a first image frame is greater than the interval time.

15. The display control method according to claim 13, wherein keeping processing a first image frame does not depend on the image frame frequency signal.

16. The display control method according to claim 13, wherein there is an interval time between two adjacent image frames; the display control method further comprises: for each of the plurality of the processing units, processing a next image frame based on the image frame frequency signal after a time to keep processing the current image frame is greater than the interval time.

17. The display control method according to claim 13, wherein there is an interval time between two adjacent image frames; the display control method further comprises: for each of the plurality of the processing units, removing the prompt signal and removing the image frame frequency disabling signal based on the combination of the image frame frequency signal and the prompt signal after a time to keep processing the current image frame is greater than the interval time, to process a next image frame based on the image frame frequency signal when the image frame frequency disabling signal is unable to be relied upon.

18. The display control method according to claim 13, wherein the image frame frequency disabling signal is generated based on a combination of the image frame frequency signal and the prompt signal after the first time point.

* * * * *